United States Patent Office 3,401,016
Patented Sept. 10, 1968

3,401,016
PROCESS FOR THE PREPARATION OF HYDROGEN FLUORIDE FROM AMMONIUM HYDROGEN FLUORIDE AND SULPHURIC ACID
Jadwiga Chmiel, Ul Raclawicka 5/3,
Gleiwitz, Poland
No Drawing. Filed Aug. 18, 1965, Ser. No. 480,773
Claims priority, application Poland, Aug. 21, 1964,
105,522
4 Claims. (Cl. 23—153)

ABSTRACT OF THE DISCLOSURE

An improved process for producing hydogen fluoride by heating ammonium bifluoride and concentrated sulfuric acid at a temperature of about 150° C., followed by adding steam or water to the reaction mixture and lowering the pressure to about 0.3 atm. while maintaining the temperature at about 150° C.

The reaction between ammonium fluoride or ammonium hydrogen fluoride and sulphuric acid, leading to the production of hydrogen fluoride and ammonium hydrogen sulphate, has been heretofore known. The reaction with sulphuric acid of high concentration e.g. 100%, is highly exothermic and may bring the temperature of the reaction mixture to about 90° C. The higher the reaction temperature, the greater the yield of hydrogen fluoride and the quantity of fluorine remaining in the ammonium hydrogen sulphate is correspondingly less. For instance, in order to obtain a hydrogen fluoride yield up to about 95%, it is necessary to heat the reaction mixture to additionally obtain a reaction temperature of 200° C.

The practical operation of this known process on an industrial scale encounters difficulties connected with corrosion. It is known to construct the reactor for this process from common steel in cases in which anhydrous sulphuric acid is used. However, at such high temperatures which are required for obtaining a good yield in the process, the steel is subjected to decarburization and to quick corrosion. It has been found that special low-carbon steel known under the denomination "Armco," is well resistant to the action of the reaction mixture up to about 170° C. Beyond this temperature, corrosion takes place. However when working below a temperature of 170° C, the process becomes uneconomic, not only in consequence of the too small yield of hydrogen fluoride but also due to the fact that by leaving a too great quantity of fluorine compounds in the ammonium hydrogen sulphate, the value of this by-product is reduced since the possible uses thereof are reduced.

An object of the invention is to provide a method of separation of hydrogen fluoride in good yield without exposing the apparatus made of low-carbon steel to excessive corrosion.

As a result of investigations on low-carbon steel corrosion caused by the given reaction mixture it has been found that the addition of water or steam considerably increases the corrosion but only at lower temperatures while from about 140° C, upward the corrosion is not increased. Furthermore it has been ascertained according to theoretical suppositions, that the addition of steam and a lowering of the pressure influence very advantageously the separation of hydrogen fluride from the reaction mixture.

According to the invention, the reaction mixture is brought to a temperature of about 150° C. in a possibly anhydrous state whereby a hydrogen fluoride separation of about 80% is obtained. Subsequently, while maintaining said temperature steam is introduced into the mixture and the pressure is lowered to about 0.3 atm. In this second stage (pressure reduction), a further 16% yield of hydrogen fluoride is obtained so that the total yield amounts to about 96% based on the fluorine contained in the fluorine substrate. In the unreacted hydrogen sulphate portion of the reaction mixture there remains up to 4% of fluorine based on the fluorine contained in the fluorine substrate and which constitutes about 1% fluorine in relation to the total weight of the reaction mixture.

The method according to the invention does not expose the apparatus to corrosion, because the temperature of the reaction mixture is lower than that at which corrosion has been ascertained to occur, and on the other hand it is higher than the temperature at which the addition of steam may produce corrosion. The hydrogen fluoride yield is quite satisfactory and the contamination of the by-product i.e. the ammonium hydrogen sulphate, with fluorine compounds is not too troublesome considering in fact that this sulphate is further processed to obtain chemical fertilizers.

I claim:
1. A process for producing hydrogen fluoride from ammonium bifluoride and sulfuric acid which comprises forming a mixture of ammonium bifluoride and concentrated sulfuric acid, heating said mixture at a temperature of about 150° C. to liberate hydrogen fluoride from said ammonium bifluoride, adding steam or water to the mixture and reducing the pressure to about 0.3 atm. while maintaining the temperature of the mixture at about 150° C. to effect a further liberation of hydrogen fluoride from said ammonium bifluoride.
2. A process as claimed in claim 1, wherein heating is effected in a reactor of low carbon steel.
3. In a process wherein hydrogen fluoride is produced from ammonium bifluoride and sulfuric acid by heating same together in a steel reactor, an improvement comprising heating at about 150° C. and atmospheric pressure to form a first portion of hydrogen fluoride and then adding steam or water while reducing the pressure to about 0.3 atm. and maintaining said temperature to form a further portion of hydrogen fluoride and prevent corrosion of the reactor.
4. A process as claimed in claim 3, wherein heating is effected in a reactor of low carbon steel.

References Cited

UNITED STATES PATENTS 2,865,711 12/1958 Gloss et al. _____ 23—153
2,981,601 4/1961 Kidde _____ 23—153

OTHER REFERENCES

"Handbook of Material Trade Names," by Zimmerman and Lavine, 1953 ed., pages 59–62, Industrial Research Service, Inc., Dover, N.H.

OSCAR R. VERTIZ, *Primary Examiner.*

EDWARD STERN, *Assistant Examiner.*